(No Model.)
F. KIMBLE.
PRUNE OR FRUIT DIPPER, WEIGHER, AND SPREADER.
No. 564,381. Patented July 21, 1896.
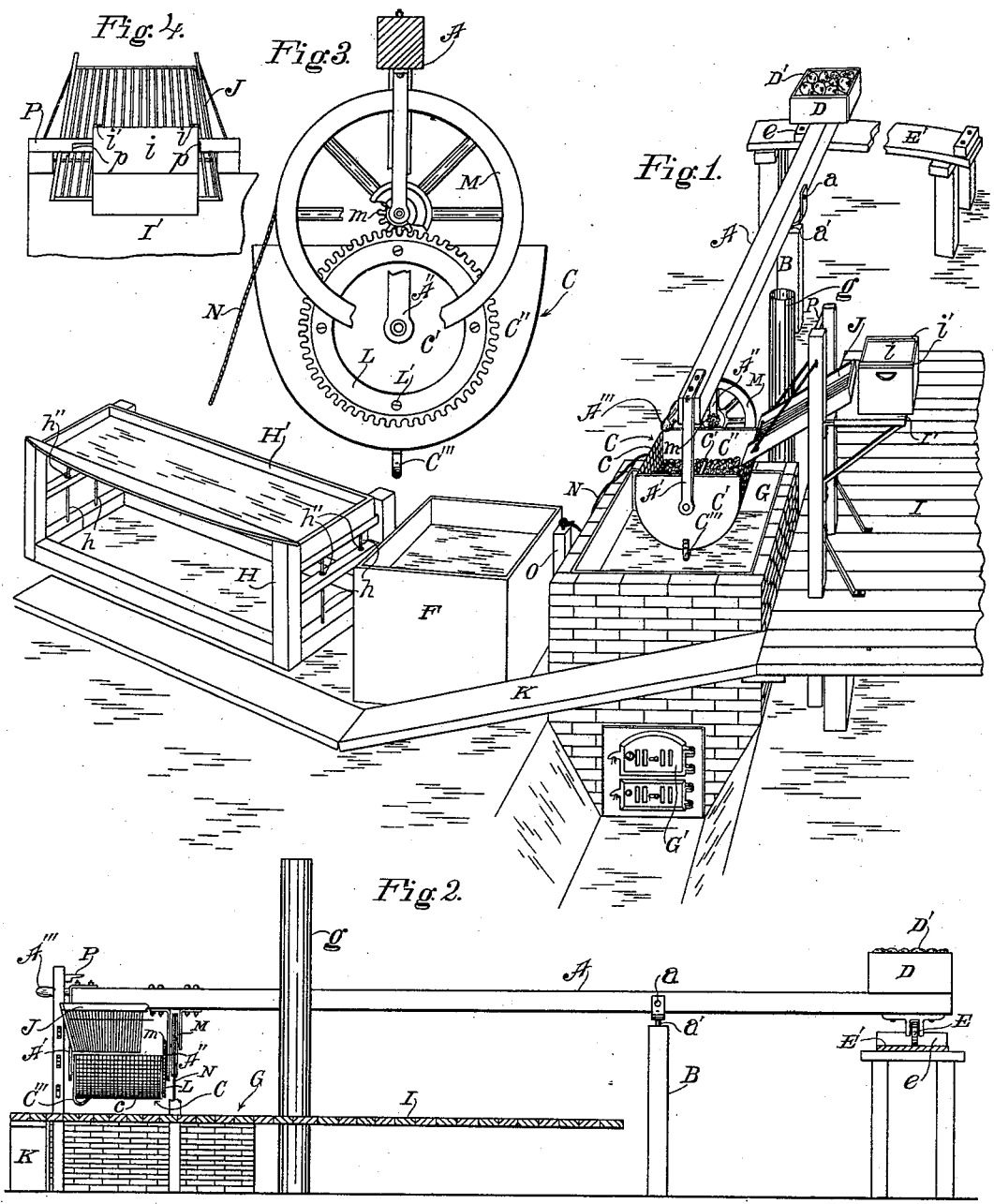
Witnesses
Perry Kingman
Alfred J. Townsend
Inventor
Fred Kimble
by Hazard & Townsend
his attys

UNITED STATES PATENT OFFICE.

FRED KIMBLE, OF LOS ANGELES, CALIFORNIA.

PRUNE OR FRUIT DIPPER, WEIGHER, AND SPREADER.

SPECIFICATION forming part of Letters Patent No. 564,381, dated July 21, 1896.

Application filed January 2, 1896. Serial No. 574,048. (No model.)

*To all whom it may concern:*

Be it known that I, FRED KIMBLE, a citizen of the United States, residing at Los Angeles, in the county of Los Angeles and State of California, have invented new and useful Improvements in Prune or Fruit Dippers, Weighers, and Spreaders, of which the following is a specification.

My invention is especially designed for preparing prunes for the market; but it is also applicable for use in dipping, rinsing, and spreading any class of fruit.

In California there are many large orchards of prunes, and in order to properly prepare this fruit for the market it is necessary that the skins be partially cut, broken, or checked by dipping the prunes in a lye-bath, then rinsing the dipped prunes to remove the lye, and afterward spreading them upon trays and drying them in the ordinary manner. On large ranches where there are many tons of fruit ripening each day the labor involved in dipping, rinsing, and spreading the crop is very great. For instance, in Kings county, California, on the Kimble prune ranch, during the past season when there was only a very light crop, before the introduction into use of my improved dipper there were being operated two of the dippers heretofore in use. With such dippers working to their full capacity, taking five men to each dipper, the utmost that could be handled in a day of ten working hours was about forty tons of prunes. This was not sufficient to handle the crop as fast as it ripened, and in order to assist in handling the surplus I built one of my improved dippers. After its completion, four men, with only one of my devices, weighed, dipped, rinsed, and spread with ease sixty tons of prunes per day. In preparing such large quantities of fruit for the market it is necessary, in order to reduce the labor and the tray-room required to a minimum, that the amount of fruit placed upon each tray be nearly the same in all instances, so that the fruit will dry equally and no vacant space be left on the tray. Heretofore there has been no manner of quickly determining the quantity of fruit placed upon a tray except by guessing at the amount of fruit discharged from the dipper upon the tray. The consequence is that unless great care is used so much fruit will be placed upon some trays as to prevent the proper drying of the fruit, while other trays will receive such a small amount of fruit that it will require an excessive number of trays to handle the crop.

The object of my invention is to produce a device whereby fruit sufficient to properly fill one tray may be quickly weighed, dipped in the lye-bath, rinsed in the rinsing-tank, and then spread upon the tray in a rapid and even manner and with the least possible expenditure of labor.

My invention consists of the means which I employ for accomplishing this result.

More explicitly, my invention comprises a lever or arm pivoted to tilt and journaled to rotate in a horizontal plane, a fruit-holding basket secured to one end of the lever, a weight arranged to counterbalance the basket and its contained load of fruit, and a dipping-vat, a rinsing-tank, and a tray-support, all arranged in the arc of a circle which the basket describes when the lever is rotated.

My invention also comprises various other features of construction and combinations of parts hereinafter fully set forth and claimed.

The accompanying drawings illustrate my invention.

Figure 1 is a perspective fragmental front elevation of a device embodying my invention. The smoke-stack is broken away, and a portion of the supporting-track and of the platform is broken away to contract the view. Fig. 2 is a side elevation of the same, looking from the right of Fig. 1. In this view a portion of one side of the chute for conducting the fruit into the basket and also of the support therefor is broken away to show the construction. Fig. 3 is a sectional view of the supporting-lever, showing that end of the fruit-basket which is at the rear in Fig. 1 and the right-hand side in Fig. 2. This view illustrates improved mechanism which I have devised for spreading the fruit evenly and accurately upon the tray. Portions of the device are broken away to expose the mechanism. Fig. 4 is a plan view of my improved box-dumping device.

In the drawings, A represents a lever which, by means of a pivot $a$, is pivoted to tilt, and by means of the journal-pivot $a'$ is also journaled to revolve in a horizontal plane. This journal-pivot is, as shown, inserted into a socket provided in the top of the supporting-post B.

C is a revoluble fruit-holding basket, which is composed of two ends C' and C'', each semicircular in form, and a body c, of galvanized wire-netting, secured to the ends. This basket in the preferred form of my device is secured to one end of the lever by means of hangers A' and A'', depending from the lever and rigidly fixed thereto. The basket is journaled to the hangers by means of a pivot or journal rod c', which, as shown, passes through the ends C' C'', longitudinally through the basket, and through the hangers, as shown in Figs. 1 and 3. On the other end of the lever I arrange a receptacle D, which is adapted to receive weights D' to counterbalance the weight of the basket and its contained load of fruit when the basket is filled with fruit. This weighted end of the lever is supported by means of a supporting-wheel E, which is arranged to run upon a track E'. This track and the supporting-wheel are so arranged that when the basket C is empty the supporting-wheel will rest upon the track and will hold the basket sufficiently elevated to clear the tops of the dipping-tank F and the lye-vat G, as shown in Figs. 1 and 2. The lye-vat G, the dipping-tank F, and the tray-support H are all arranged in the arc of a circle described by the basket C when the lever is rotated to cause the basket to swing in a horizontal plane.

I represents a platform which is provided for the laborer who fills the basket with fruit, and J represents a screen chute or spout arranged to screen the sand and leaves from the fruit and to conduct the fruit down into the basket when the basket is in the position shown in Figs. 1 and 2.

I' is a bench upon which the boxes i which hold the fruit are placed previous to dumping the fruit into the basket.

K represents a plank walk arranged for the laborer who attends to dipping, rinsing, and spreading the fruit.

G' is a door to the furnace, which is arranged beneath the lye-vat G, whereby the lye is heated to the proper temperature for dipping the fruit, and g is a stack for conducting the smoke from the furnace.

In ordinary usage the operator who attends to dipping and rinsing the fruit can tilt the basket by means of the handle C''' to cause the fruit to discharge upon the tray H', which is arranged upon the tray-support H; but since it requires considerable practice to cause the fruit to spread evenly upon the tray, I have devised automatic means for tilting the basket and causing the fruit to spread evenly upon the tray from one end thereof to the other. These means consist of the basket C, journaled to the hangers A' and A'' by suitable means, such as the journal-rod c', extending through the basket and through the hangers; a cog-wheel L, secured to the basket by suitable means, such as the bolts or screens L'; a power or band wheel M, journaled to the lever and provided with a pinion m arranged to mesh with the cog-wheel L, as shown in Fig. 3; a rope N or other flexible connection passed around the power or band wheel M and having one end secured thereto and having its other end secured to a post O or other suitable support arranged preferably between the dipping-vat G and the tray-support H.

In practice the operator stands upon the platform I, and the boxes of fruit are unloaded thereupon. The operator places two boxes of fruit upon the table I', and the basket being in position beneath the chute, as shown in Fig 1, the fruit is poured into the chute and passes thence down into the basket, while sand, leaves, &c., pass through the wires of the chute and upon the platform, thus avoiding filling the vat with sediment, which, with the dippers heretofore in use, has been a serious objection, for reasons which are obvious. The boxes which I employ on my ranch hold from forty-three to forty-five pounds of undried fruit, and the trays which I employ hold eighty pounds of such fruit when spread with one layer only upon the tray. When boxes and trays of this size are used, the operator empties one box into the fruit-basket and throws the box to one side. He then seizes another box and pours the fruit from it into the basket until the weight of the fruit in the basket overbalances the weight D' on the other end of the lever and the basket begins to descend into the vat. Then the operator tips the box back upon the bench. The man who attends to the dipping seizes the handle A''', which is provided at the end of the lever, and dips the fruit into the lye-bath. The fruit and the weight are so evenly balanced that this requires practically very little effort upon the part of the operator. When the fruit has been sufficiently dipped to cause the skins to become checked or cracked, so that the juice of the fruit may evaporate therethrough, the operator tilts the lever to raise the basket until the supporting-wheel E rests upon the track E'. He then walks forward, rotating the lever until the basket is brought over the rinsing-tank F, when he again depresses the lever to carry the basket, with its contained fruit, into the rinsing-tank. When the fruit has been sufficiently rinsed, he again raises the lever to carry the basket from the tank and rotates the lever to bring the basket over the tray H'. In ordinary usage the operator then holds to the handle A''' with one hand, grasps the handle C''' with the other hand, and rotates the basket upon the journal-rod c' while swinging the lever to carry the basket along the length of the tray, so that the fruit is thus spilled upon the tray from near one end to the other end. By reason of the hangers being rigidly fixed to the lever this is rendered extremely easy of accomplishment.

The tray-support H is provided with four upright rods $h$, which are arranged to be swung back and forth and to carry the tray back and forth, so that the rods $h$, which move in openings $h''$, provided in the stationary frame $h'''$, are thus alternately brought into contact with the opposite walls of such openings, and by the shock thus produced causes the fruit to become evenly spread upon the tray. This, however, is not of my invention, and I lay no claim thereto, so that detailed description thereof is unnecessary herein.

After the fruit has been discharged from the basket, the weight upon the other end of the lever depresses that end of the lever until the supporting-wheel rests upon the track, when the operator gives the lever a swing to cause it to rotate upon the journal-pivot until the basket is again brought beneath the chute in the position shown in Figs. 1 and 2. A suitable stop $e$ is provided to engage the wheel E to stop it when the basket has reached the proper position. While the operator who attends to dipping and spreading the fruit is helping remove the filled tray from the tray-support, the other laborer is filling the basket with fruit, so that by the time the first laborer returns to the platform I the basket is ready filled, so that the operation of dipping, rinsing, and spreading may again proceed. Thus practically no time is lost and great rapidity of action is secured.

By regulating the weights upon the end of the lever the amount of fruit spread upon each tray can be regulated to a nicety and with no greater expenditure of time than is necessary to fill the ordinary dipper. By actual experiment I have found that by using my improved dipper the weight of dried fruit upon the trays does not vary more than three-quarters of a pound, taking the entire crop clear through. This is advantageous for the reason that not only is all the tray-room utilized, but the grower can estimate the amount of dried fruit which his orchard will produce, even before the fruit has all been dried.

It is obvious that the fruit-basket may be arranged to discharge the fruit therefrom by opening the bottom of the basket in a manner similar to dredging-buckets, and although I consider the revoluble basket the best, still it is to be understood that I do not limit my claims to such construction. The construction of dredge-buckets above referred to is old and well known, and requires no illustration herein.

In Fig. 4 I have shown a device which I employ for rapidly and conveniently emptying the boxes of fruit. Fruit-boxes are provided at each end with a cleat $i'$, as shown in Fig. 1, and when the box is turned to empty it some of the prunes hang or lodge behind these cleats.

I arrange the chute J so that its top comes about midway of the height of the box and I provide a supporting-bar P above the chute to receive and support the box as shown in Fig. 4. This box is notched to form bumping-shoulders $p\,p$, arranged at a distance apart greater than the length of the fruit-box, so that when the box is tilted, as shown in Fig. 4, a quick shove to right and left will cause the box to strike the shoulders and dislodge any fruit which may have lodged behind the cleats. This gives greater rapidity of action than can be secured otherwise; and by arranging the screen so that its top comes substantially midway the height of the box it is an easy matter to tilt the box, the weight of the fruit being nearly balanced upon the edge of the chute as the box is tipped to cause the fruit to empty into the basket.

Now having described my invention, what I claim as new, and desire to secure by Letters Patent, is—

1. A fruit-dipper comprising a lever pivoted to tilt and also journaled to rotate in a horizontal plane; hangers secured to one end of the lever; a revoluble fruit-holding basket journaled to the hangers; a dipping-vat and a rinsing-tank both arranged in the arc of a circle which the basket describes when the lever is partially rotated in a horizontal plane.

2. A fruit dipper and weigher comprising a lever pivoted to tilt and journaled to rotate in a horizontal plane; hangers secured to one end of the lever: a revoluble fruit-holding basket journaled in the hangers; a weight arranged on the other end of the lever to counterbalance the basket and its contained fruit; and a dipping-vat and a rinsing-tank both arranged in the arc of a circle described by the basket when the lever is rotated.

3. A fruit dipper and weigher comprising an arm pivoted to tilt and journaled to rotate in a horizontal plane; hangers fixed to one end of the lever; a revoluble fruit-holding basket journaled in the hangers; suitable means arranged to counterbalance the weight of the basket and its contained fruit; and a dipping-vat and a rinsing-tank both arranged in the arc of a circle described by the basket when the arm is rotated.

4. A fruit dipper and weigher comprising a lever pivoted to tilt and journaled to rotate in a horizontal plane; a fruit-holding basket suspended from one end of the lever and arranged to discharge its contained fruit when desired; a weight arranged on the other end of the lever to counterbalance the basket and its contained fruit; a supporting-wheel arranged to support the weighted end of the lever; a track for such wheel to run on when the lever is rotated in a horizontal plane; and a dipping-vat and a rinsing-tank both arranged in the arc of a circle described by the basket when the lever is rotated.

5. A fruit dipper and weigher comprising a lever pivoted to tilt and journaled to rotate in a horizontal plane; a fruit-holding basket suspended from one end of the lever and arranged to discharge its contained fruit when desired; a weight arranged on the other end of the lever to counterbalance the basket and its contained fruit; a supporting-wheel arranged to support the weighted end of the lever; a track for such wheel to run on when the lever is rotated in a horizontal plane; and a dipping-vat, a rinsing-tank and a tray-support all arranged in the arc of a circle described by the basket when the lever is rotated.

6. A fruit dipper and weigher comprising a lever pivoted to tilt and journaled to revolve in a horizontal plane; a fruit-basket pivoted to one end of the lever to rotate in a vertical plane when desired; a weight-receptacle secured to the other end of the lever to receive weights to counterbalance the basket and its contained fruit; a supporting-wheel for supporting the weighted end of the lever; a track for the supporting-wheel to run upon when the lever is rotated; a dipping-vat, a rinsing-tank and a tray-support arranged in the arc of a circle described by the basket, and suitable means for rotating the basket.

7. A fruit dipper and weigher comprising a lever pivoted to tilt and journaled to revolve in a horizontal plane; hangers depending from one end of the lever; a semicylindrical fruit-basket journaled to the hangers; a weight arranged on the other end of the lever to counterbalance the basket and its contained fruit; a supporting-wheel arranged to support the weighted end of the lever; a track for the supporting-wheel to run upon; a dipping-vat, a rinsing-tank and a tray-support, all arranged in the arc of a circle described by the basket when the lever is rotated.

8. The combination set forth of the lever pivoted to tilt and journaled to rotate and provided at one end with the hangers rigidly fixed thereto; and revoluble fruit-basket journaled to the hangers; a cog-wheel secured to the basket; a power or band wheel journaled to the lever and provided with a pinion arranged to mesh with the cog-wheel; a rope or other flexible connection passed around the power or band wheel and having one end secured thereto, and having its other end secured to a post or other suitable support and arranged to actuate the band-wheel to rotate the cog-wheel to cause the basket to revolve and to discharge its fruit upon the fruit-tray as the lever is rotated to carry the basket over the tray.

9. The combination set forth of the lever pivoted to tilt and journaled to rotate in a horizontal plane; hangers rigidly fixed to one end of the lever; a revoluble fruit-basket journaled in the hangers; a dipping-vat, a rinsing-tank and a tray-support, all arranged in the arc of a circle which the basket describes when the lever is rotated; and suitable means arranged to operate the basket to cause the same to partially rotate when the basket is being swung along the tray-support to cause the fruit to be spread along the tray.

10. The combination set forth of the lever pivoted to tilt and journaled to rotate in a horizontal plane; a fruit-holding basket suspended from one end of the lever and arranged to discharge its contained fruit when desired; a dipping-vat, a rinsing-tank and a tray-support all arranged in the arc of a circle which the basket describes when the lever is rotated; and suitable automatic means arranged to operate the basket to cause it to distribute the fruit along the tray as the basket is carried therealong by the rotation of the lever.

11. A fruit dipper and weigher comprising a lever pivoted to tilt and journaled to rotate in a horizontal plane; a fruit-holding basket suspended from one end of the lever and arranged to discharge its contained fruit when desired; a weight arranged to counterbalance the basket and its contained load of fruit; a supporting-wheel arranged to support the weighted end of the lever; a track for the supporting-wheel to run upon; a dipping-vat and a rinsing-tank arranged in the arc of a circle described by the basket when the lever is rotated; a platform arranged at one side of the dipping-vat, and a screen-chute arranged to conduct the fruit down into the fruit-basket when the lever is rotated to bring the basket over the dipping-vat.

12. A fruit dipper and weigher comprising a lever pivoted to tilt and journaled to rotate in a horizontal plane; a fruit-holding basket suspended from one end of the lever and arranged to discharge its contained fruit when desired; a weight arranged to counterbalance the basket and its contained load of fruit; a supporting-wheel arranged to support the weighted end of the lever; a track for the supporting-wheel to run upon; a dipping-vat, a rinsing-tank and a tray-support, all arranged in the arc of a circle described by the basket when the lever is rotated; a platform arranged at one side of the dipping-vat, and a screen-chute arranged to conduct the fruit down into the fruit-basket when the lever is rotated to bring the basket over the dipping-vat.

13. In combination, the screen-chute, the box-support arranged above the chute and provided with the bumping-shoulders arranged at a distance apart greater than the length of the box, and the box adapted to rest on the chute and the support, between the bumping-shoulders.

14. In combination, the table arranged to support the fruit-box; the screen-chute arranged with its top substantially midway the height of the box; the supporting-bar arranged above the chute and provided with the bumping-shoulders arranged at a distance apart greater than the length of the box; and the box adapted to rest on the chute and the support, between the bumping-shoulders.

FRED KIMBLE.

Witnesses:
ALFRED I. TOWNSEND,
JAMES R. TOWNSEND.